United States Patent (10) Patent No.: US 8,986,556 B2
Jin et al. (45) Date of Patent: Mar. 24, 2015

(54) HEAT ASSISTED NARROW POLE DESIGN WITH TRAILING SHIELD

(71) Applicant: Headway Technologies, Inc., Miplitas, CA (US)

(72) Inventors: Xuhui Jin, San Jose, CA (US); Yuchen Zhou, San Jose, CA (US); Kenichi Takano, Nagano (JP); Joe Smyth, Aptos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 49 days.

(21) Appl. No.: 13/758,561

(22) Filed: Feb. 4, 2013

(65) Prior Publication Data

US 2013/0140268 A1 Jun. 6, 2013

Related U.S. Application Data

(62) Division of application No. 13/066,420, filed on Apr. 14, 2011, now Pat. No. 8,369,189.

(51) Int. Cl.
H01L 21/302 (2006.01)
H01L 21/461 (2006.01)
B44C 1/22 (2006.01)
C03C 15/00 (2006.01)
C03C 25/68 (2006.01)
C23F 1/00 (2006.01)
G11B 5/84 (2006.01)
B82Y 10/00 (2011.01)
G11B 5/31 (2006.01)
G11B 5/00 (2006.01)

(52) U.S. Cl.
CPC . G11B 5/84 (2013.01); B82Y 10/00 (2013.01); G11B 5/3116 (2013.01); G11B 5/314 (2013.01); G11B 2005/0021 (2013.01)
USPC ............. 216/22; 438/689; 438/706; 438/709; 438/734; 216/58; 216/67

(58) Field of Classification Search
None
See application file for complete search history.

(56) References Cited

U.S. PATENT DOCUMENTS

| 6,493,183 | B1 | 12/2002 | Kasiraj et al. | |
|---|---|---|---|---|
| 7,262,936 | B2 | 8/2007 | Hamann et al. | |
| 7,724,470 | B2 | 5/2010 | Poon et al. | |
| 7,729,085 | B2 | 6/2010 | Jin et al. | |
| 8,036,069 | B1 * | 10/2011 | Jin et al. | 369/13.32 |
| 8,059,496 | B1 * | 11/2011 | Zhou et al. | 369/13.33 |
| 2008/0192376 | A1 | 8/2008 | Tanaka et al. | |
| 2008/0198496 | A1 | 8/2008 | Shimazawa et al. | |
| 2009/0052092 | A1 | 2/2009 | Zhou et al. | |
| 2010/0002330 | A1 | 1/2010 | Lille | |
| 2010/0315735 | A1 | 12/2010 | Zhou et al. | |

* cited by examiner

Primary Examiner — Stephanie Duclair
(74) Attorney, Agent, or Firm — Saile Ackerman LLC; Stephen B. Ackerman

(57) ABSTRACT

A TAMR (Thermally Assisted Magnetic Recording) write head is formed with a narrow pole tip, a trailing edge magnetic shield and, optionally, a plasmon shield. The narrow pole tipped write head uses the energy of laser generated edge plasmons, formed in a plasmon generating layer, to locally heat a PMR magnetic recording medium slightly below its Curie temperature, Tc. When combined with the effects of the narrow tip, this local heating to a temperature below Tc is sufficient to create good transitions and narrow track widths in the magnetic medium. The write head is capable of writing effectively on state-of-the-art PMR recording media having Hk of 20 kOe or more.

12 Claims, 2 Drawing Sheets

HEAT ASSISTED NARROW POLE DESIGN WITH TRAILING SHIELD

This is a Divisional application of U.S. patent application Ser. No. 13/066,420, filed on Apr. 4, 2011, which is herein incorporated by reference in its entirety and assigned to a common assignee.

BACKGROUND OF THE INVENTION

1. Field of the Invention

This invention relates to the fabrication of magnetic read/write heads that employ TAMR (thermally assisted magnetic recording) to enable writing on magnetic media having high coercivity and high magnetic anisotropy. More particularly, it relates to the use of a narrow magnetic pole in conjunction with plasmon mode heating to obtain narrow track widths for recording at high densities.

2. Description of the Related Art

Magnetic recording at area data densities of between 1 and 10 Tera-bits per $in^2$ involves the development of new magnetic recording media, new magnetic recording heads and, most importantly, a new magnetic recording scheme that can delay the onset of the so-called "superparamagnetic" effect. This latter effect is the thermal instability of the extremely small regions on which information must be recorded, in order to achieve the required data densities. A way of circumventing this thermal instability is to use magnetic recording media with high magnetic anisotropy and high coercivity that can still be written upon by the increasingly small write heads required for producing the high data density. This way of addressing the problem produces two conflicting requirements:

1. The need for a stronger writing field that is necessitated by the highly anisotropic and coercive magnetic media.
2. The need for a smaller write head of sufficient definition to produce the high areal write densities, which write heads, disadvantageously, produce a smaller field gradient and broader field profile.

Satisfying these requirements simultaneously may be a limiting factor in the further development of the present magnetic recording scheme used in state of the art hard-disk-drives (HDD). If that is the case, further increases in recording area density may not be achievable within those schemes. One way of addressing these conflicting requirements is by the use of assisted recording methodologies, notably thermally assisted magnetic recording, or TAMR.

The heating effect of TAMR works by raising the temperature of a small region of the magnetic medium to essentially its Curie temperature (Tc), at which temperature both its coercivity and anisotropy are significantly reduced and magnetic writing becomes easier to produce within that region.

In the following, we will address our attention to a particular implementation of TAMR described in the prior arts, namely the transfer of electromagnetic energy to a small, sub-micron sized region of a magnetic medium through interaction of the magnetic medium with the field of an edge plasmon excited by an optical frequency laser.

The edge plasmon mode is excited in an overlap region between a conducting plasmon generator (PG) and a waveguide (WG). The source of optical excitement can be a laser diode, also contained within the read/write head structure, or a laser source that is external to the read/write head structure, either of which directs its beam of optical radiation at the generator through a means of intermediate energy transfer such as an optical waveguide (WG). As a result of the WG, the light optical mode couples to a propagating plasmon mode of a PG, whereby the optical energy is converted into plasmon energy. This plasmon energy is then transferred to the medium at the pole tip, at which point the heating occurs at a very small spot size. When the heated spot on the medium is correctly aligned with the magnetic field produced by the narrow pole tip, TAMR is achieved. The following prior arts describe TAMR implementations in various forms.

K. Tanaka et al. (US Publ. Pat. Appl. 2008/0192376) and K. Shimazawa et at (US Publ. Pat. Appl. 2008/0198496) describe TAMR structures that utilize edge plasmon modes to couple to a WG and then transmit and concentrate the plasmon energy at the ABS (air bearing surface) of the TAMR head.

Harmann et al. (US Publ. Pat. Appl. 2005/0190496) discloses generating a heated spot on the leading edge side of a write gap.

Jin et al. (US Publ. Pat. Appl. 2007/0230047) teaches a TAMR writer with a narrow pole tip.

Poon et al, (US Publ. Pat. Appl. 2008/0154127) also discloses heating a magnetic media as it passes beneath a write gap.

Zhou et al. (US Publ. Pat. Appl. 2009/0052092) shows a small heating coil in a write gap.

Kasiraj et al. (U.S. Pat. No. 6,493,183) shows an electrically resistive heater in a write gap between pole tips.

Lille (US Publ. Pat. Appl. 2010/0002330) describes a near field light source providing a pre-heating pulse using an optical waveguide.

The magnetic pole designs for TAMR application that are disclosed in the prior arts (such as those cited above) generally utilize a pole that is much wider than that being used in current (non-TAMR) perpendicular magnetic recording (PMR) designs that address ultra-high areal density. The narrow track that is needed for such ultra-high areal density in TAMR is realized by the very small size of the heated spot when the recording is thermally dominant for a magnetic medium with a high coercivity, such as FePt with L10 orientation.

As it is still in the development stage, FePt magnetic recording medium suffers from many adverse properties, such as roughness, large grain size distribution, large variation in Tc (Curie temperature), large dHc/Hc and large switching field distributions. These properties, when taken together, limit the linear density capability of the FePt medium compared to the state-of-the-art PMR medium that is granular CoCrPt based. Improving the FePt medium for higher areal density recording as desired might have a long way to go based on the current state of medium development and medium evaluation. On the other hand, state-of-the-art PMR medium has been able to achieve >1500 kbpi linear density with good SNR and BER and is likely to be improved even further to achieve even higher areal densities.

When conventional PMR media with low coercivity is used, a wide magnetic pole and leading edge recording design will cause adjacent track erasures as a result of the pole width (>300 nm). Thus, the head designs disclosed in the cited prior arts will find it difficult to achieve the desired high areal recording densities in conventional PMR media.

SUMMARY OF THE INVENTION

It is a first object of the present invention to achieve magnetic recording at high linear densities (>1500 kbpi) using currently available state-of-the-art PMR magnetic recording media with slightly higher Hk.

It is a second object of the present invention to produce such high areal densities while requiring only moderately elevated temperatures that are less than the Curie temperature (<Tc) of the recording media during the recording process.

It is a third object of the present invention to achieve the first two objects while providing a pole design that does not create significant adjacent track erasures (ATE).

It is a fourth object of the present invention to fulfill the previous objects with a head design that is uncomplicated and consistent with designs currently in use.

To meet these objects, we will address our attention to a particular implementation of TAMR, namely the transfer of electromagnetic energy to a small, sub-micron sized region of a magnetic medium through interaction of the magnetic medium with the field of an edge plasmon excited by an optical frequency laser. This energy transfer is provided while using a main write pole with a very narrow, shielded pole tip. Under these conditions, as will be described in detail below, the transferred electromagnetic energy can cause the temperature of the medium to increase locally to values less than Tc, yet still be sufficient to create good transitions within a state-of-the-art PMR recording medium.

The edge plasmon mode is excited in an overlap region between a conducting edge plasmon generator (EPG) and a waveguide (WG). The source of optical excitement can be a laser diode, also contained within the read/write head structure, or a laser source that is external to the read/write head structure, either of which directs its beam of optical radiation at the generator through a means of intermediate transfer such as an optical waveguide (WG). As a result of the WG, the light optical mode couples to a local plasmon mode of a propagating plasmon mode of a PG, whereby the optical energy is converted into plasmon energy. This plasmon energy is then transferred to the medium in the write-gap region of the pole tip, at which point the heating occurs at a very small spot size. When the heated spot on the medium is correctly aligned with the magnetic field produced by the narrow pole tip, TAMR is achieved.

The present invention will, therefore, disclose a heat-assisted narrow magnetic pole with a trailing shield in which the heating spot is delivered in the write gap by an edge plasmon generator. With this design, magnetic dominant recording will occur, with a narrow track and consequent higher track density, at moderately elevated medium temperatures that can be realized on current PMR media with a slightly higher Hk, in this case being an Hk of 20 kOe or more. Without the localized heating in the write gap, the writer field and gradient produced by the narrow pole are not sufficient enough to switch the medium magnetization and write a good transition.

The TAMR writer design of the invention is one in which the pole has a narrow shape that permits high areal densities to be achieved in present magnetic media by means of thermally assisted writing at moderately elevated temperatures. Specifically, this design is a heat assisted narrow magnetic pole with a trailing shield (and supplemental plasmon shield) in which the heating spot is delivered in the write gap by an edge plasmon generator (EPG). The EPG is formed as a conducting layer (a layer of electrically conductive material) contiguous with the magnetic core of the pole tip itself, so the thermal energy of the plasmon and the magnetic field of the tip can be closely aligned. The design of the head structure is uncomplicated and permits trailing edge recording with a trailing shield and high magnetic field gradient. Since the heating is below Tc, less laser power is required and better thermal stability of the head structure is obtained. With the localized heating in the write gap, the writer field and the gradient produced by the narrow pole are sufficient to switch the medium magnetization and write a good transition.

BRIEF DESCRIPTION OF THE DRAWINGS

The objects, features, and advantages of the present invention are understood within the context of the Description of the Preferred Embodiment as set forth below. The Description of the Preferred Embodiment is understood within the context of the accompanying figures, wherein:

FIG. 2 a is a vertical cross-sectional side view, FIG. 2 b is a front cross-sectional view taken at a rear (distal to the ABS) plane and FIG. 2c is a front cross-sectional view taken at the ABS plane.

DESCRIPTION OF THE PREFERRED EMBODIMENTS

Each of the preferred embodiments of this invention is a shielded TAMR head for producing high density recording on a currently available PMR magnetic medium. The TAMR head incorporates an edge plasmon generator (EPG), a trailing magnetic shield, a plasmon shield for additional optical spot confinement and a narrow pole tip having leading edge and side tapers that extends between approximately 0 nm-100 nm into the ABS to concentrate the magnetic flux.

Optical energy is supplied by a laser, directed through a waveguide (WG) as a diffraction-limited waveguide mode to the EPG, where it excites a confined edge plasmon mode by evanescent coupling at the overlap region between the WG and the EPG. The edge plasmon mode propagates along the edge of the EPG and finally delivers its energy to the ABS and heats up the medium locally in the write gap region of the ABS.

First Embodiment

Figure 1:
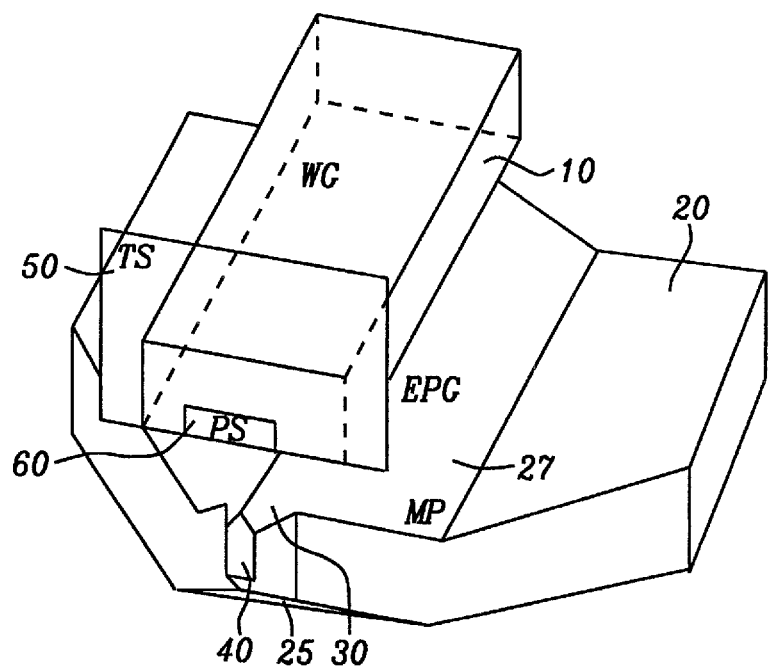
FIG. 1 is a schematic 3-dimensional drawing of the invention, showing the narrow pole design, the plasmon generator, a trailing magnetic shield and a plasmon shield.

Referring to schematic FIG. 1, there is shown a 3-dimensional view of the heat assisted magnetic write pole with a narrow pole tip design of the present invention. An optical waveguide, WG, (10) is positioned adjacent to (and separated from) the trailing edge side of the main pole (MP) (20). The shape of the MP (20) shows an upward sloped leading edge taper (25) and downward sloped side tapers (27). An edge plasmon generator (EPG) (30) is formed as a conducting layer conformally covering a substantial portion of the trailing edge of the MP, which can here be considered as extending over the side tapers (27). Note also that although the EPG has a thickness between approximately 5 nm and 80 nm, the thickness is not shown in this perspective drawing.

The region of coverage by the EPG, which includes coverage over the symmetric sides (27) of the MP and over the entire trailing edge surface of the narrow pole tip (40), overlaps with, but is separated from, a portion of the WG above it. It is at this overlap region at which the edge plasmon mode is excited in the EPG by the WG.

The main pole (20) with its narrow projecting pole tip (40), NP, is formed as a single piece of magnetic material such as Ni, Fe, Co and their alloys. The NP (40) extends outward from the ABS end of the body of the main pole (20) in the direction perpendicular to the ABS plane, for a distance (denoted the neck height, NH, of the pole tip) of between approximately 0 nm and 100 nm to concentrate the magnetic flux at the magnetic medium. At its ABS end, the width of the pole tip is between approximately 5 nm and 80 nm along the cross-track direction, the length of the pole tip along the down-track direction (base-to-peak in the figure) is between approximately 50 nm-200 nm and the radius (height of triangular portion) of the pole tip peak is between approximately 2 nm and 20 nm.

The EPG (30) conformally covers the peaked trailing edge of the NP. In this preferred embodiment, the ABS shape of the narrow pole tip is a rectangle with a peaked (triangular) upper (i.e., trailing edge) portion. A trailing edge shield (50), TS, is formed at the ABS of the WG, at the trailing edge side of the pole tip. The trailing edge shield is formed of magnetic materials such as Ni, Fe, Co and their alloys and its dimensions are between approximately 200 nm-500 nm in the y-direction, between approximately 300 nm and 2000 nm in the z-direction and between approximately 50 nm-200 nm from the ABS (the x-direction). A plasmon shield (60), PS, is formed on the leading edge of the trailing edge shield. The plasmon shield, which is formed of noble, highly conducting metal such as Au, Ag, Cu and their alloys, has dimensions of between approximately 10 nm and 100 nm in the cross-track direction, between approximately 50 nm and 500 nm in the down-track direction and between approximately 50 nm and 200 nm from the ABS. The plasmon shield is used to further confine the optical spot produced by the EPG layer by shunting the electric field of the plasmon mode.

Referring now to FIG. 2 a, there is shown a schematic side cross-sectional view of the write pole structure in FIG. 1. The cross-section is along the center plane of the structure and it passes through the peak of the MP (20) and NP (40). There is shown the wave guide (10), with the trailing edge shield (50) at its ABS end (the ABS being indicated by a dashed line). There is also seen the side cross-section of the MP (20) with the NP (40), extending from the end of the MP to the ABS for the neck-height, NH, distance. The leading edge taper (25) is shown with the NP at its ABS end. The cross-section of the EPG layer (30) is shown on the trailing edge surface of MP (20) and over the narrow pole tip (40) as well.

Thus, the EPG can be said to have a magnetic core (the pole material) from which the writing magnetic field emanates while the heating energy of the edge plasmon emanates from the EPG layer. The region of overlap between the WG and the EPG (which is the entire length of the EPG shown here) is the region within which the optical mode of the WG couples with the edge plasmon mode in the EPG.

Figure 2A:
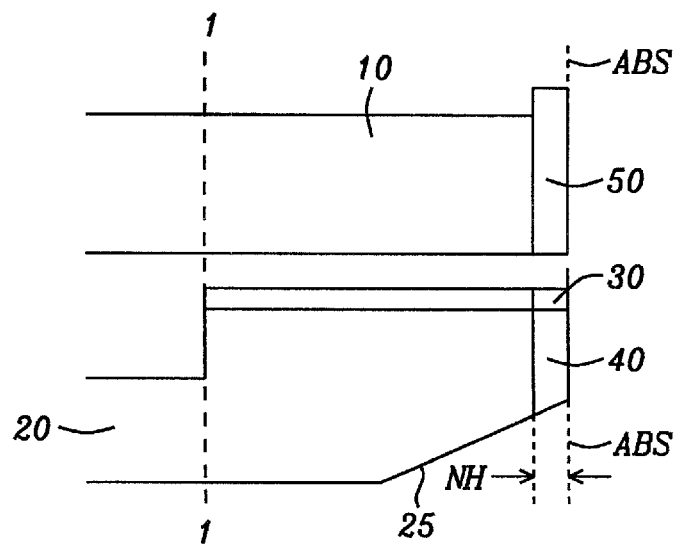
FIGS. 2a, 2b and 2c are schematic cross-sectional views of the invention of FIG. 1.
Figure 2B:
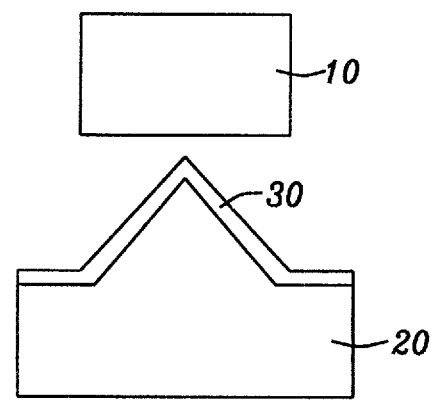

Referring next to schematic FIG. 2 b there is shown the horizontal cross-sectional view of FIG. 2a, taken through a plane parallel to but distal from the ABS plane. This plane is marked at its edge by the vertical dashed line 1-1 in FIG. 2a, which is at the back-end (distal end) of the main pole (20), away from the narrow pole tip, where the peaked, trailing edge surface is largest. The EPG layer (30) is shown conformally covering the trailing edge surface of the MP at this back end. The WG (10) is shown above the EBG layer (30), separated from it (not in contact) along the overlap region. According to FIG. 2a, the overlap region extends between the ABS and the 1-1 plane, which is the cross-sectional plane of FIG. 2b.

Figure 2C:
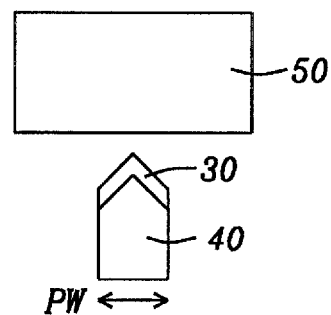

Referring finally to schematic FIG. 2c, there is shown a horizontal cross-sectional view of the structure in FIG. 2a, taken through the ABS plane of the narrow pole tip. There can be seen the trailing shield (50) (the plasmon shield is not shown) and the ABS peaked shape of the narrow pole tip (40) covered conformally by the EBG layer (30). It can be seen that the system behaves as a conducting EPG layer conformally covering a magnetic core. The cross-track (y-direction) width of the NP (shown as a double headed arrow labeled PW) can be between approximately 5 nm and 80 nm, depending on the track density required. The EPG layer can be formed of Au, Ag or their alloys, which is deposited on the magnetic pole (here, of triangular shape) formed by IBE or similar etching process to a thickness of between approximately 5 nm and 80 nm. The pole tip is also etched, together with the EPG, to achieve its width as well as its shape. If the surface area of the tip at the ABS is too small, the confined edge plasmon mode may "leak" out because the boundary conditions become inadequate for confinement, in which case the overall optical efficiency of the system will be reduced.

Second Embodiment

Figure 3:
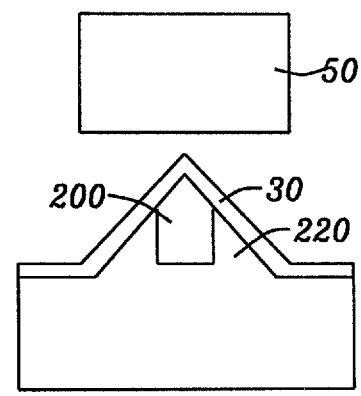
FIG. 3 is a schematic cross-sectional view at an ABS plane of an alternative embodiment of the invention.

Referring to schematic FIG. 3, there is shown an alternative structure that forms a second embodiment of the invention. In this design, the magnetic pole is still tapered down to a narrow tip (200) of magnetic material at the ABS, but the EPG layer (30) retains the same cross-sectional dimension from the back end of the pole where it commences (i.e., as is shown in FIG. 2 (b) for the first embodiment), to the ABS end (which is shown here in FIG. 3). The trailing shield (50) is shown above the pole tip. Maintaining the dimensions of the EPG layer is accomplished by filling the region around the etched pole tip with non-magnetic metals (220), such as Ta, Ti, Ru, Cr or any of their composites, to provide support for the EPG layer. It is to be noted that FIG. 3 is analogous to FIG. 2(c), in that it illustrates the ABS end of the pole in this second embodiment, just as FIG. 2(c) illustrates the ABS of the pole in the first embodiment. Superficially, FIG. 3 may look like FIG. 2(b), which shows the back end of the first embodiment, but this is because the EPG layer retains its shape from back to front. Thus, the magnetic portion of the pole tip may be diminished in surface area and cross-sectional area, but the EPG layer can still retain its coverage because it is supported from beneath by the non-magnetic material (220) filling a region surrounding the pole tip laterally. The waveguide (50) is shown above the pole.

An exemplary process to form this structure would require first etching (eg., an IBE) of the magnetic pole to create the narrow portion of the pole tip, shown here as a rectangular prism with a triangular roof-shaped upper portion, and then depositing the non-magnetic metal uniformly and symmetrically around the etched tip. Then a second IBE (for example) will form the triangular shape with the sloped sidewall by etching away the deposited non-magnetic layer from the sloping triangular sides of the pole tip, leaving horizontally extending portions to either side of the pole tip. Finally, the EPG material is deposited as a layer over the composite formation of magnetic and non-magnetic materials, which supplies sufficient physical support for the EPG layer.

Mathematical modeling of the spot size produced by an EPG layer formed over a 50 nm pole tip with a magnetic trailing shield shows that a spot size of 50 nm can be achieved. Further modeling has been done to compare the recording patterns of different head designs and media. By using the PMR media with Hk=20 kOe (kilo-Oersteds), at a temperature of 575 K, which is less than the media Tc of 650 K, the present invention writes the best transitions with the narrowest tracks. Without heat assistance, the writability of PMR becomes weaker as the pole tip is scaled down to achieve greater track densities. A conventional PMR writer (producing no heating) can write good transitions in low Hk media (Hk≈15 kOe), but the track becomes wider. In particular, the transitions caused in FePt media are poorer when a leading optics TAMR design is used, but with a wider pole width. Overall, the disclosed heat assisted narrow magnetic pole design of the present two embodiments, including the trailing shield, is able to write better transitions with narrower track width into granular CoCrPt based magnetic medium by moderately elevating the medium with higher Hk.

As is understood by a person skilled in the art, the preferred embodiments of the present invention are illustrative of the present invention rather than being limiting of the present invention. Revisions and modifications may be made to methods, processes, materials, structures, and dimensions through which is formed and used a trailing edge shielded, surface plasmon generating TAMR write head with a narrow pole tip producing a heating spot in the write gap a recording temperature less than Tc in state-of-the-art recording media, while still providing such a TAMR write head, formed and used in accord with the present invention as defined by the appended claims.

What is claimed is:

1. A method of forming a TAMR (thermally assisted magnetic recording) write head comprising:
   providing a magnetic write pole;
   using a first etching process, etching a narrow tip at an ABS end of said write pole, said narrow tip being a rectangular prism having a cross-sectional shape in an ABS plane comprising a rectangle capped at a trailing edge side by a triangular peak having a base width equal to the width of said rectangle;
   depositing a non-magnetic layer over said narrow tip, said layer covering said triangular peak and extending laterally and symmetrically to both sides of said narrow tip;
   using a second etching process, etching said non-magnetic layer to remove that portion covering said triangular peak but leaving a remaining portion abutting both lateral sides of said rectangular portion, said remaining portion sloping downward to form a continuation of said triangular peak and thence extending horizontally laterally and symmetrically; then
   forming a plasmon generating layer contiguously over exposed trailing edge surfaces of said narrow pole tip and said non-magnetic layer.

2. The method of claim 1 wherein the width of said narrow tip is between approximately 5 nm-80 nm in a cross-track direction, wherein the length of said narrow tip along a down-track direction is between approximately 50 nm-200 nm and wherein the radius of a peak of said narrow pole tip is between approximately 2 nm and 20 nm.

3. The method of claim 1 wherein said non-magnetic layer is formed of Ta, Ti, Ru, Cr or their composites.

4. The method of claim 1 wherein said plasmon generating layer is a layer of Ag, Au or Cu and is formed to a thickness of between approximately 5 nm and 80 nm.

5. The method of claim 1 including the formation of a leading edge shield formed of the magnetic materials Ni, Fe, Co and their alloys having dimensions between approximately 200 nm and 500 nm in a cross-track direction, between approximately 300 nm and 2000 nm in a down-track direction and between approximately 50 nm and 200 nm from the ABS.

6. The method of claim 5 further including the formation of a plasmon shield on a leading edge of said trailing edge shield.

7. The method of claim 6 wherein said plasmon shield is formed of the highly conducting metals Au, Ag, Cu and their alloys and has dimensions of between approximately 10 nm-100 nm in the cross-track direction, of between approximately 50 nm-500 nm in the down-track direction and of between approximately 50 nm-200 nm from the ABS.

8. A method of forming a TAMR (thermally assisted magnetic recording) write head comprising:
   providing a magnetic write pole;
   using an etching process, etching a narrow tip at an ABS end of said write pole, said narrow tip being a rectangular prism having a cross-sectional shape in an ABS plane comprising a rectangle capped at a trailing edge side by a triangular peak having a base width equal to the width of said rectangle; then
   forming a plasmon generating layer contiguously over exposed trailing edge surfaces of said triangular peak portion of said narrow pole tip.

9. The method of claim 8 wherein the width of said narrow tip is between approximately 5 nm-80 nm in a cross-track direction, wherein the length of said narrow tip along a down-track direction is between approximately 50 nm-200 nm and wherein the radius of a peak of said narrow pole tip is between approximately 2 nm and 20 nm.

10. The method of claim 8 including the formation of a trailing edge shield formed of the magnetic materials Ni, Fe, Co and their alloys having dimensions between approximately 200 nm and 500 nm in a cross-track direction, between approximately 300 nm and 2000 nm in a down-track direction and between approximately 50 nm and 200 nm from the ABS.

11. The method of claim 10 further including the formation of a plasmon shield on a leading edge of said trailing edge shield.

12. The method of claim 11 wherein said plasmon shield is formed of the highly conducting metals Au, Ag, Cu and their alloys and has dimensions of between approximately 10 nm-100 nm in the cross-track direction, of between approximately 50 nm-500 nm in the down-track direction and of between approximately 50 nm-200 nm from the ABS.

* * * * *

UNITED STATES PATENT AND TRADEMARK OFFICE
CERTIFICATE OF CORRECTION

| | | |
|---|---|---|
| PATENT NO. | : 8,986,556 B2 | Page 1 of 1 |
| APPLICATION NO. | : 13/758561 | |
| DATED | : March 24, 2015 | |
| INVENTOR(S) | : Xuhui Jin et al. | |

It is certified that error appears in the above-identified patent and that said Letters Patent is hereby corrected as shown below:

In the Specification,

Column 1, line 5, delete "filed on April 4, 2011" and replace with -- filed on April 14, 2011 --.

Signed and Sealed this
Second Day of June, 2015

Michelle K. Lee
*Director of the United States Patent and Trademark Office*